United States Patent
Endo

(10) Patent No.: US 10,277,899 B2
(45) Date of Patent: Apr. 30, 2019

(54) IMAGE TRANSMISSION SYSTEM AND METHOD OF CONTROLLING SAME

(71) Applicant: CANON KABUSHIKI KAISHA, Tokyo (JP)

(72) Inventor: Hiroaki Endo, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/631,171

(22) Filed: Jun. 23, 2017

(65) Prior Publication Data

US 2017/0374365 A1    Dec. 28, 2017

(30) Foreign Application Priority Data

Jun. 28, 2016 (JP) ................................ 2016-127857

(51) Int. Cl.
| | |
|---|---|
| *H04N 19/10* | (2014.01) |
| *H04N 19/124* | (2014.01) |
| *H04N 19/176* | (2014.01) |
| *H04N 19/182* | (2014.01) |

(52) U.S. Cl.
CPC ......... *H04N 19/124* (2014.11); *H04N 19/176* (2014.11); *H04N 19/182* (2014.11)

(58) Field of Classification Search
CPC .. H04N 19/124; H04N 19/182; H04N 19/176; H04N 19/10; H04N 19/40; H04N 19/42; H04N 19/44

See application file for complete search history.

(56) References Cited

U.S. PATENT DOCUMENTS

| | | | | |
|---|---|---|---|---|
| 5,764,374 | A * | 6/1998 | Seroussi | H04N 19/593 341/65 |
| 5,926,223 | A * | 7/1999 | Hardiman | G06F 3/14 348/E5.108 |
| 8,934,535 | B2 * | 1/2015 | Fallon | H03M 7/30 375/240.01 |
| 2009/0281425 | A1 * | 11/2009 | Sasahara | H04N 19/124 600/443 |
| 2010/0067575 | A1 * | 3/2010 | Nakayama | H04N 19/61 375/240.12 |

(Continued)

FOREIGN PATENT DOCUMENTS

JP    2010-004514 A    1/2010

*Primary Examiner* — Wesley J Tucker

(74) *Attorney, Agent, or Firm* — Cowan, Liebowitz & Latman, P.C.

(57) ABSTRACT

A system includes an image transmitting unit and an image receiving unit. The image transmitting unit has a compression unit for compressing, in accordance with a provided compression parameter, a pixel block in image data, and a first transmitting unit for transmitting the compressed data to an image receiving unit in the system. The image receiving unit has a receiving unit for receiving the compressed data, a decompression unit for decompressing the received compressed data, a determination unit for determining a compression parameter based on the result of the decompression, and a second transmitting unit for transmitting the determined compression parameter to the image transmitting unit. The compression unit compresses an untransmitted second pixel block in the image data to be compressed in accordance with the compression parameter transmitted from the second transmitting unit.

15 Claims, 9 Drawing Sheets

(56) References Cited

U.S. PATENT DOCUMENTS

| | | | |
|---|---|---|---|
| 2012/0033880 A1* | 2/2012 | Balster | H04N 19/647 382/166 |
| 2016/0219243 A1* | 7/2016 | Lida | H04N 21/64769 |
| 2018/0262754 A1* | 9/2018 | Komi | H04N 19/117 |

* cited by examiner

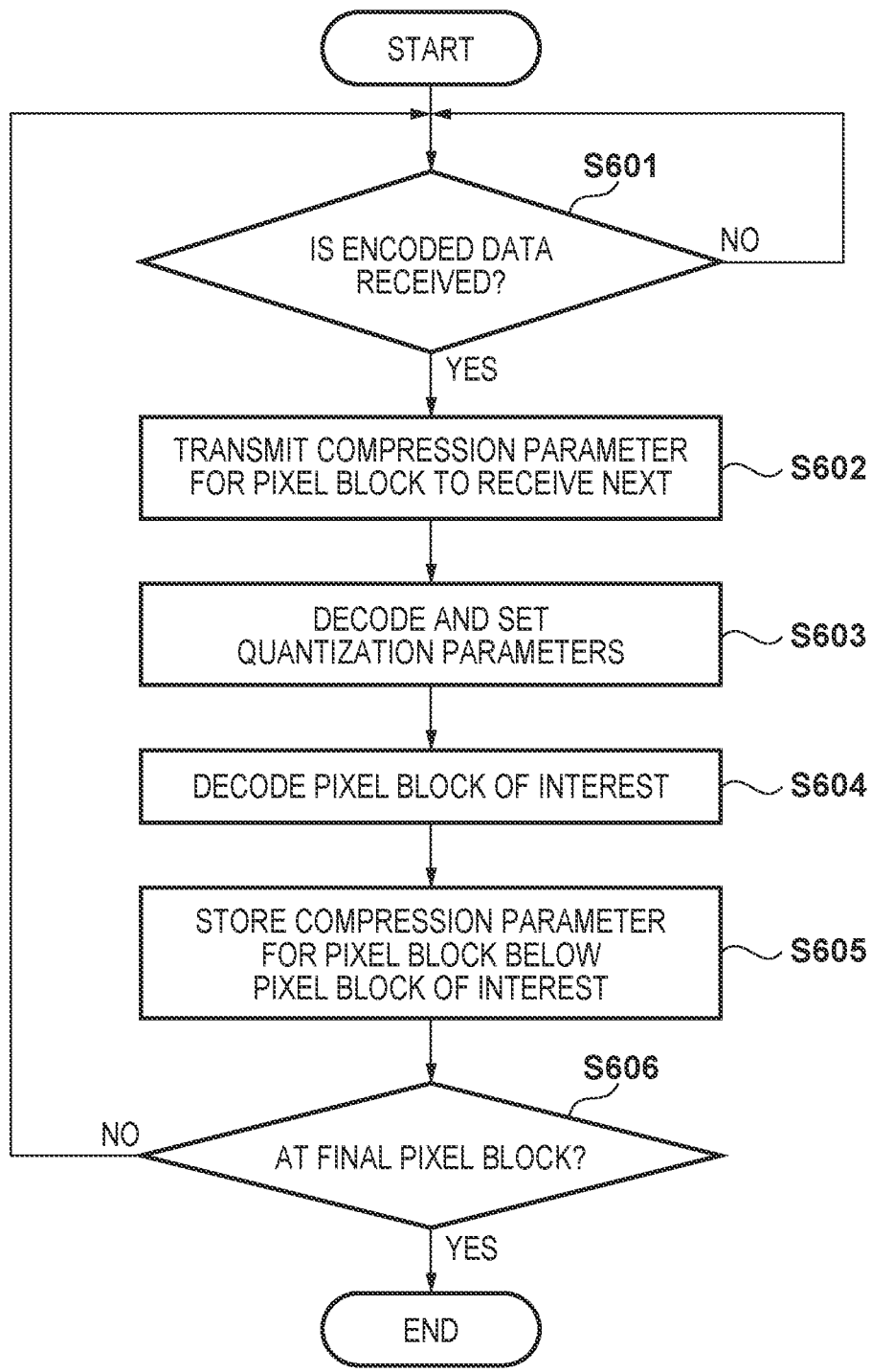

FIG. 7A

ALLOCATION NUMBER: 0

| n | CODE WORD |
|---|---|
| 0 | |
| 1 | 010 |
| 2 | 011 |
| 3 | 0001 |
| 4 | 0010 |
| 5 | 0011 |
| 6 | 00000 |
| 7 | 00001 |

FIG. 7B

ALLOCATION NUMBER: 1

| n | CODE WORD |
|---|---|
| 0 | 010 |
| 1 | |
| 2 | 011 |
| 3 | 0001 |
| 4 | 0010 |
| 5 | 0011 |
| 6 | 00000 |
| 7 | 00001 |

FIG. 7C

ALLOCATION NUMBER: 2

| n | CODE WORD |
|---|---|
| 0 | 0001 |
| 1 | 010 |
| 2 | |
| 3 | 011 |
| 4 | 0010 |
| 5 | 0011 |
| 6 | 00000 |
| 7 | 00001 |

FIG. 7D

ALLOCATION NUMBER: 3

| n | CODE WORD |
|---|---|
| 0 | 0001 |
| 1 | 0010 |
| 2 | 010 |
| 3 | 1 |
| 4 | 011 |
| 5 | 0011 |
| 6 | 00000 |
| 7 | 00001 |

FIG. 7E

ALLOCATION NUMBER: 4

| n | CODE WORD |
|---|---|
| 0 | 0 0 0 0 0 |
| 1 | 0 0 0 1 |
| 2 | 0 0 1 0 |
| 3 | 0 1 0 |
| 4 | 1 |
| 5 | 0 1 1 |
| 6 | 0 0 1 1 |
| 7 | 0 0 0 1 |

FIG. 7F

ALLOCATION NUMBER: 5

| n | CODE WORD |
|---|---|
| 0 | 0 0 0 0 0 |
| 1 | 0 0 0 0 1 |
| 2 | 0 0 0 1 |
| 3 | 0 0 1 0 |
| 4 | 0 1 0 |
| 5 | 1 |
| 6 | 0 1 1 |
| 7 | 0 0 1 1 |

FIG. 7G

ALLOCATION NUMBER: 6

| n | CODE WORD |
|---|---|
| 0 | 0 0 0 0 0 |
| 1 | 0 0 0 0 1 |
| 2 | 0 0 0 1 |
| 3 | 0 0 1 0 |
| 4 | 0 0 1 1 |
| 5 | 0 1 0 |
| 6 | 1 |
| 7 | 0 1 1 |

FIG. 7H

ALLOCATION NUMBER: 7

| n | CODE WORD |
|---|---|
| 0 | 0 0 0 0 0 |
| 1 | 0 0 0 0 1 |
| 2 | 0 0 0 1 |
| 3 | 0 0 1 0 |
| 4 | 0 0 1 1 |
| 5 | 0 1 0 |
| 6 | 0 1 1 |
| 7 | 1 |

IMAGE TRANSMISSION SYSTEM AND METHOD OF CONTROLLING SAME

BACKGROUND OF THE INVENTION

Field of the Invention

The present invention relates to an image transmission system and a method of controlling the same.

Description of the Related Art

In recent years, with an image capturing apparatus for digital video or the like, an image data amount handled by the system has conspicuously increased in conjunction with an increase in resolution and an increase in frame rate, and it is necessary to make an image memory and a bus interface circuit faster, leading to higher cost for the apparatus.

Accordingly, there are techniques for suppressing a need for a speed increase for a bus by performing compression encoding of image data before and after a bus interface such as between an image capturing element and an image memory to reduce a data amount (for example, the document Japanese Patent Laid-Open No. 2010-4514).

However, according to the method disclosed in this document, if a difference value between pieces of adjacent pixel data such as a sharp edge portion exceeds a predetermined threshold, there is a need to halve original pixel data bits in accordance with quantization (for example, going from 10 bits to 5 bits), and there is a possibility that image degradation will become great.

SUMMARY OF THE INVENTION

The present invention was conceived in view of the above described problem, and provides a technique for realizing, in a system in which a transmitting side compresses an image before transmitting, transmission with good efficiency by a receiving side adaptively setting to the transmitting side a parameter for compression to reduce a load in accordance with compression on the transmitting side.

According to an aspect of the invention, there is provided an image transmission system, comprising an image transmitting unit, and an image receiving unit connected to the image transmitting unit via a transmission bus, wherein the image transmitting unit has a compression unit configured to compress a pixel block configured by a plurality of pixels in image data to be compressed in accordance with a provided compression parameter, and a first transmitting unit configured to transmit compressed data obtained by the compression unit to the image receiving unit, wherein the image receiving unit has a receiving unit configured to receive the compressed data from the image transmitting unit, a decompression unit configured to decompress the received compressed data, a determination unit configured to determine a compression parameter based on a result of decompression of a first pixel block by the decompression unit, and a second transmitting unit configured to transmit the determined compression parameter to the image transmitting unit, wherein the compression unit compresses an untransmitted second pixel block in the image data to be compressed in accordance with the compression parameter transmitted by the second transmitting unit, and wherein the decompression unit decompresses compressed data of the second pixel block from the image transmitting unit in accordance with the compression parameter determined by the determination unit.

The present invention can realize, in a system that compresses and transmits in units of pixel blocks from a transmitting side, transmission with good efficiency by a receiving side adaptively setting to the transmitting side a parameter for compression to reduce a load in accordance with compression on the transmitting side.

Further features of the present invention will become apparent from the following description of exemplary embodiments (with reference to the attached drawings).

BRIEF DESCRIPTION OF THE DRAWINGS

FIG. 6 is a flowchart illustrating processing by an image receiving unit in the embodiment.

FIGS. 7A to 7H are explanatory views for allocation of quantization coefficient codes.

DESCRIPTION OF THE EMBODIMENTS

Explanation in detail is given below for an embodiment according to the present invention, in accordance with the drawings.

An image transmission system in the present embodiment is something implemented in an image capturing apparatus such as a video camera. If a frame rate or a number of pixels of an image (moving image) captured in an image capturing apparatus increases, a data amount of image data transmitted from an image sensor unit to a video processing unit increases. Therefore, a bandwidth of a transmission bus therebetween is pressured. In the present embodiment, explanation is given for an example in which pressure on the bandwidth of a transmission bus is alleviated by integration in one chip that causes the image sensor unit to have a compression capability.

Figure 1:
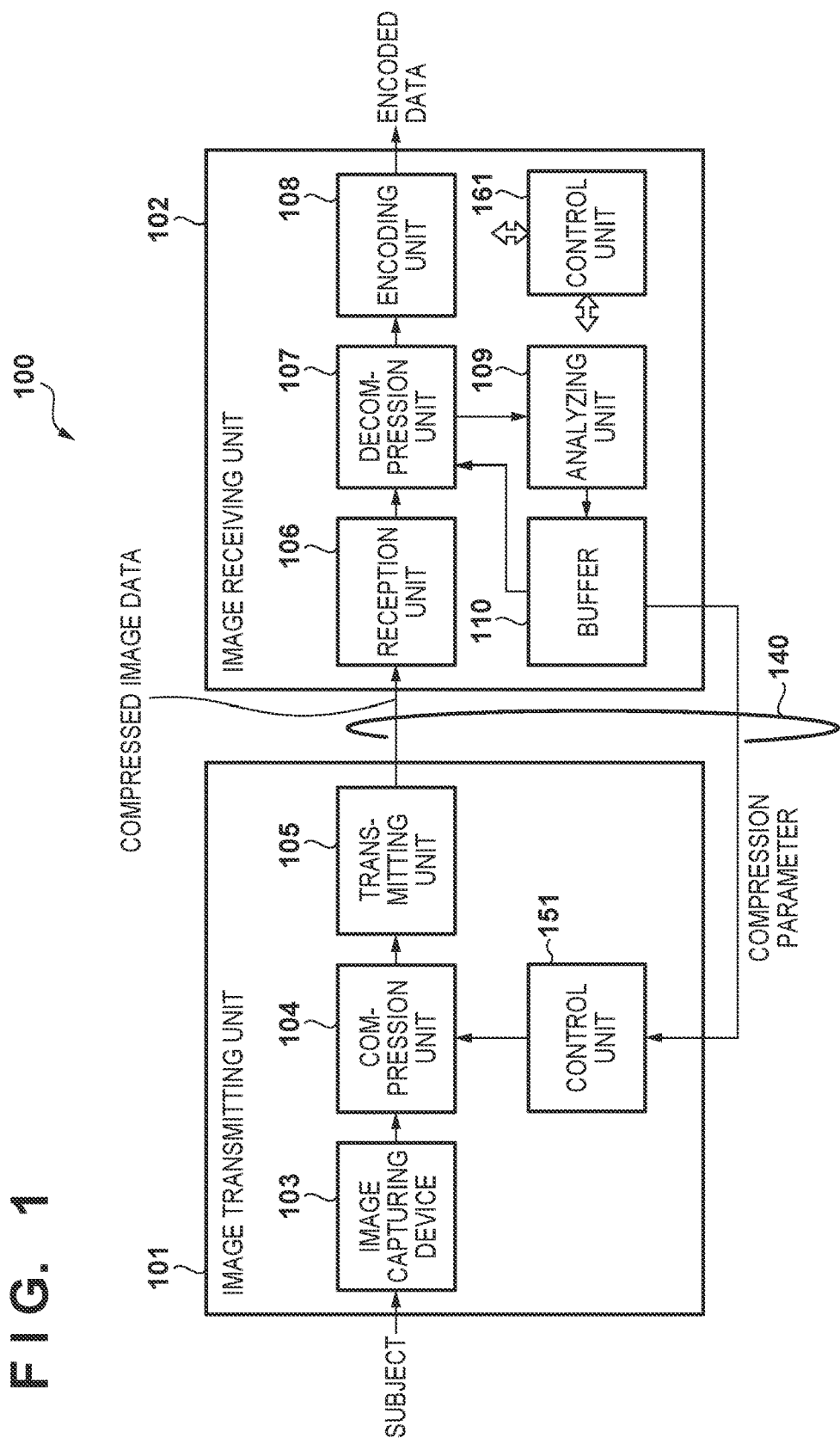
FIG. 1 is a block configuration diagram of an image processing apparatus in an embodiment.

FIG. 1 is a block configuration diagram of an image transmission system 100 of the present embodiment. The image transmission system 100 includes an image transmitting unit 101 and an image receiving unit 102. The image transmitting unit 101 includes an image capturing device 103, a compression unit 104, and a transmitting unit 105 in addition to a control unit 151 that is responsible for control of the image transmitting unit. The image receiving unit 102 includes a reception unit 106, a decompression unit 107, an encoding unit 108, an analyzing unit 109, and a buffer 110 in addition to a control unit 161 that is responsible for control of the image receiving unit 102. The image transmitting unit 101 and the image receiving unit 102 are connected to each other via a transmission bus 140.

The image capturing device 103 includes an image sensor, and receives subject light from an optical system such as lenses (not shown) to generate image data. In the present embodiment, the image capturing device 103 is assumed to output moving image data that is 1920 horizontal pixels× 1080 vertical pixels, and 60 frames per second (fps). The compression unit 104 performs compression encoding on the image data for each frame generated by the image capturing device 103, to generate compressed image data. The transmitting unit 105 transmits the generated compressed image data to the image receiving unit 102 via a transmission channel (the transmission bus 140). The control unit 151 receives compression parameters from the image receiving unit 102, and sets the received compression parameters to the compression unit 104.

In the present embodiment the image transmitting unit 101 is configured as one semiconductor integrated circuit chip (IC chip). Accordingly, even if the resolution of the image sensor increases, it is possible to suppress the bandwidth of a transmission bus outside of the chip circuitry being pressured.

The compressed image data is received by the reception unit 106 and supplied to the decompression unit 107. The decompression unit 107 decodes the compressed image data to decompress an amount of information of the image data. The encoding unit 108 encodes decompressed image data by high-efficiency encoding such as H.264 for example, and generates encoded data. This encoded data is recorded in a recording medium (not shown).

In addition, information obtained when performing decompression processing by the decompression unit 107 is transmitted to the analyzing unit 109, and the analyzing unit 109 analyzes the information obtained at a time of decompression to determine the compression parameters, and stores the compression parameters in the buffer 110.

The compression parameters stored in the buffer 110 are transmitted to the image transmitting unit 101 (the control unit 151) to be used when the compression unit 104 performs compression processing. In addition, they are also transmitted to the decompression unit 107 to be used when the decompression unit 107 performs decompression processing.

Specifically, for example the image transmitting unit 101 is an image sensor device, and the image receiving unit 102 is an image processing LSI that incorporates image processing and high-efficiency encoding processing. In addition, the transmission bus 140 between the image sensor device (corresponds to an image transmitting unit) and the image processing LSI (an image receiving unit) is a high-speed interface such as Sub-LVDS for example.

<Explanation of Compression Unit>

Explanation is given below regarding operation of the compression unit 104 of the present embodiment. Firstly FIG. 4 is used to give an explanation regarding a pixel block that the compression unit 104 sets as a unit of compression processing.

Figure 4:
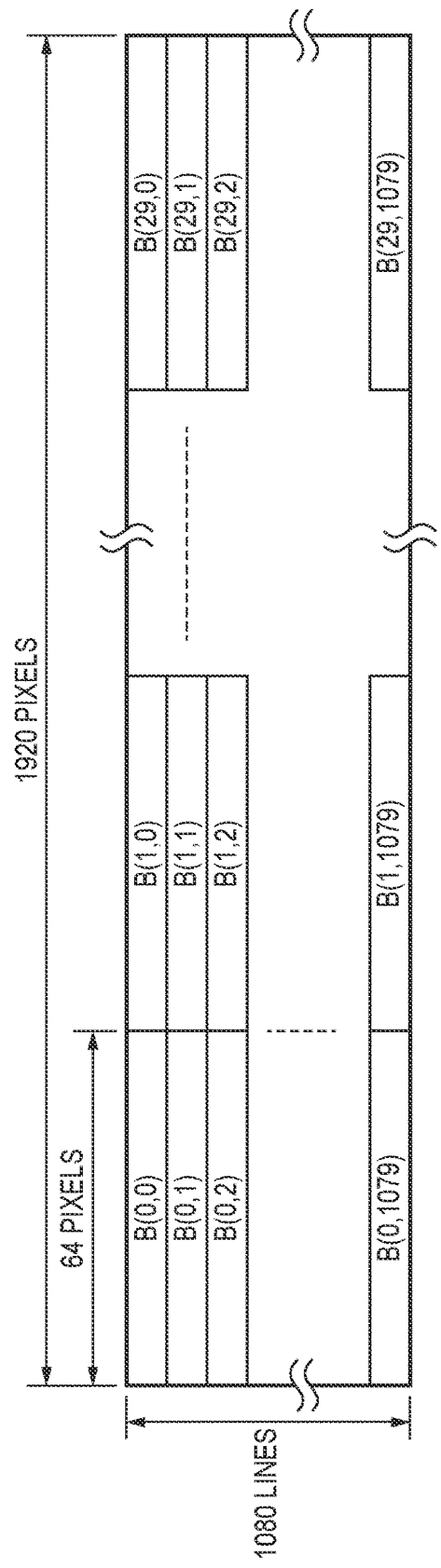
FIG. 4 is an explanatory view of a pixel block in the embodiment.

Bold lines of FIG. 4 indicate a whole screen (a frame), which is given as an image having a resolution of 1920 horizontal pixels and 1080 vertical lines in the present embodiment. Image data indicated by this frame is divided into units of 64 pixels that are consecutive in the horizontal direction. These 64 horizontal pixels are set as a unit of compression encoding processing. Hereinafter, this unit of compression encoding processing is referred to as a pixel block. It is expressed in FIG. 4 as B(x, y). Note that x indicates the horizontal coordinate of the pixel block, and y indicates the vertical coordinate of the pixel block.

In addition, in the present embodiment, the image capturing device 103 has an AD converter, and data of each pixel is set as digital data having 12 bits, and outputted to the compression unit 104. In other words, in the present embodiment, one pixel in image data before being compressed by the compression unit 104 is explained as 12 bits. In addition, in the present embodiment, a pixel block is given as pixels that are consecutive in the horizontal direction, but there is no limitation to this, and may be another rectangle such as 32 horizontal pixels×2 vertical lines.

Figure 2:
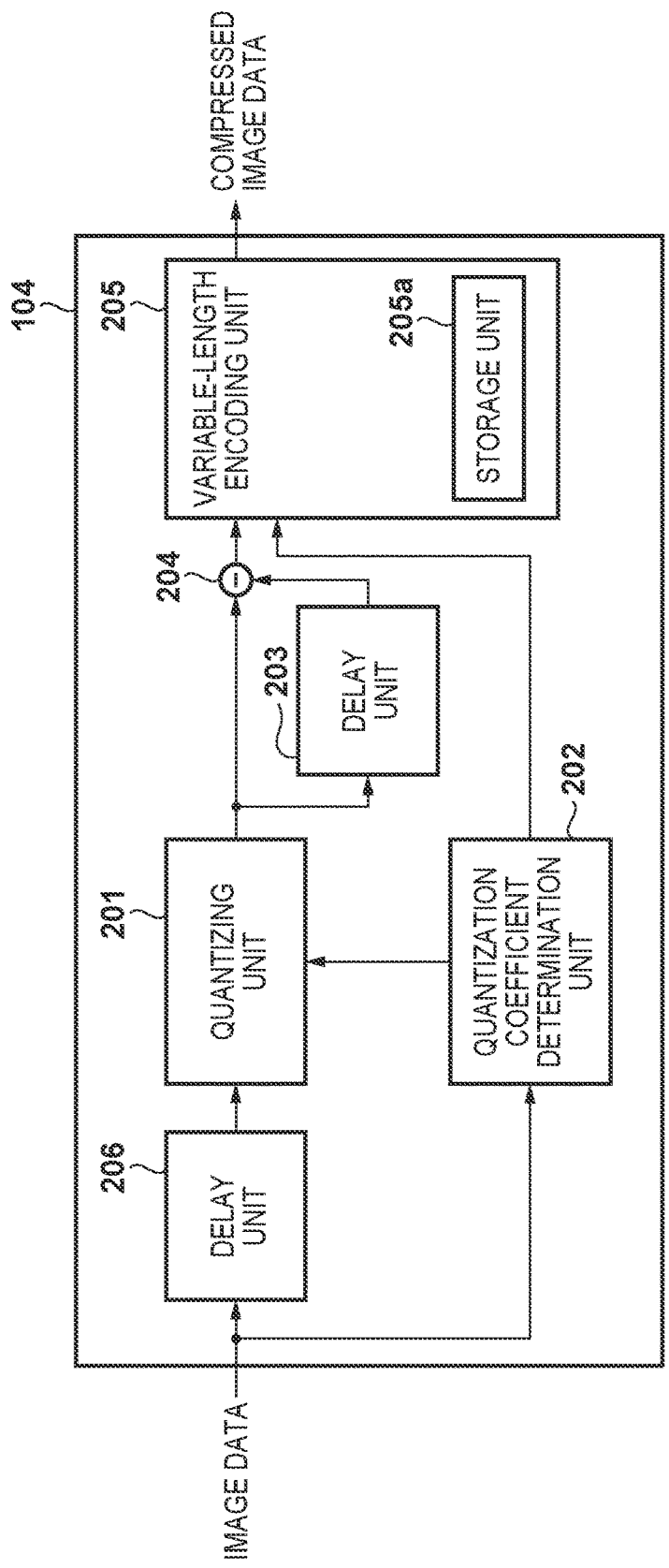
FIG. 2 is a block configuration diagram of a compression unit in the embodiment.

FIG. 2 is a block diagram illustrating an example of a configuration of the compression unit 104. Image data generated by the image capturing device 103 is transmitted to a delay unit 206 and a quantization coefficient determination unit 202. A pixel block supplied to the delay unit 206 and the quantization coefficient determination unit 202 is referred to below as a pixel block of interest. A quantizing unit 201 quantizes each pixel in the pixel block of interest after a quantization coefficient for the pixel block of interest is determined by the quantization coefficient determination unit 202. Specifically, the quantization coefficient determination unit 202 requires a certain amount of time to determine the quantization coefficient with respect to the pixel block of interest. Providing the delay unit 206 is due to this reason.

The quantization coefficient determination unit 202 analyzes a received pixel block of interest, and determines (details explained later), from a plurality of candidates prepared in advance, a quantization coefficient parameter for calculating a quantization coefficient when quantizing the 64 pixels included in the pixel block of interest. The quantization coefficient determination unit 202 supplies the quantization coefficient calculated based on the determined quantization coefficient parameter to the quantizing unit 201, and supplies the quantization coefficient parameter to a variable-length encoding unit 205.

The quantizing unit 201 quantizes, by the quantization coefficient input from the quantization coefficient determination unit 202, each pixel value included in the pixel block of interest received via the delay unit 206. The quantizing unit 201 outputs the quantized pixel values to a delay unit 203 and a subtractor 204. The delay unit 203 is assumed to be something that delays by one pixel's worth, for example.

In the subtractor 204, a pixel value after quantizing that is output from the quantizing unit 201 is subtracted from a pixel value after quantizing that is output from the delay unit 203 to obtain a difference therebetween, and this is outputted to the variable-length encoding unit 205. A so-called DPCM (Differential Pulse Code Modulation) code is calculated. Note that it is assumed that a difference is not calculated for a pixel at the start (the head) of the pixel block (it is sufficient if the output of the delay unit 203 is set to 0).

The variable-length encoding unit 205 performs variable-length encoding on the difference value outputted by the subtractor 204, by using Golomb coding for example. In addition, the variable-length encoding unit 205 also performs variable-length encoding on the quantization coefficient parameter that is supplied from the quantization coefficient determination unit 202 and is for calculating the quantization coefficient. The variable-length encoding unit 205 supplies the transmitting unit 105 with a code word for the quantization coefficient parameter, and subsequently encoded data (Golomb encoded data in the embodiment) of the difference value of the quantized pixel.

Next explanation is given for processing for determining the quantization coefficient by the quantization coefficient determination unit 202 in the embodiment.

The quantizing unit 201 in the embodiment quantizes by dividing a pixel value by $2^n$. Consequently, processing performed by the quantization coefficient determination unit 202 can be referred to as processing for calculating the quantization coefficient by determining the exponent "n" of the real number "2". Accordingly, this "n" is referred to as the quantization coefficient parameter because it is a parameter for determining the quantization coefficient.

As explained earlier, the compression unit 104 uses DPCM in the embodiment. Specifically, a difference between adjacent pixels is encoded. The difference being small means that the values of adjacent pixels are similar, and that a code amount is small. Therefore, the quantization coefficient may be small.

Conversely, in the case where the difference is large, the value after quantizing becomes large when the quantization coefficient is small, and the code amount increases. It is necessary to make the quantization coefficient be large to suppress a code amount that is generated.

As described above, the quantization coefficient determination unit 202 obtains a variance of the 64 pixels in the pixel block of interest, and obtains the "n" based on the size of the variance. In the embodiment, n is set as an integer in the range of 0 to 7. Note that, instead of obtaining the variance, to simplify the calculation configuration may be taken to obtain a difference between a maximum value and a minimum value of pixel values in the pixel block and then determine "n" from the difference. In addition, because the quantization coefficient is set to $2^n$ in the present embodiment as described above, actual calculation of the quantizing is processing that bit shifts input data by the number n. In other words, each time the value of n increases by 1, the number of significant bits of the data after quantizing is reduced by 1.

Next explanation is given regarding variable-length encoding by the variable-length encoding unit 205. As explained earlier, the variable-length encoding unit 205 in the embodiment performs encoding of the quantization coefficient parameter n determined by the quantization coefficient determination unit 202, as well as the difference value of the quantized pixels from the subtractor 204. Accordingly, explanation is given regarding variable-length encoding of the quantization coefficient parameter.

In the present embodiment the quantization coefficient parameter n is one of eight integers from 0 to 7 as explained earlier. FIGS. 7A to 7H illustrate an example of correspondence tables for code words that correspond to each quantization coefficient parameter. There are eight ways, as in FIGS. 7A to 7H, of associating a quantization coefficient parameter n and the code word thereof, and identification of one of these is by an allocation number.

The variable-length encoding unit 205 of the compression unit 104 has a storage unit 205a for holding the correspondence tables illustrated in FIGS. 7A through 7H. The variable-length encoding unit 205 encodes the quantization coefficient parameter in accordance with the allocation number included in the compression parameters from the image receiving unit 102. In other words, a table corresponding to an allocation number included in the compression parameters from the image receiving unit 102 is read out from the correspondence tables illustrated by FIGS. 7A through 7H that are stored in the storage unit 205a, and the quantization coefficient parameter is encoded based on this table. For example, if the quantization coefficient parameter n of the pixel block of interest is "2" and the allocation number is "4", the variable-length encoding unit 205, based on FIG. 7E, generates "0010" which is expressed by 4 bits as the code word for the quantization coefficient parameter. As shown in the figure, the code length differs in accordance with the allocation number, even with the same quantization coefficient parameter. This means that it is possible to encode the quantization coefficient parameter n with a high compression rate if the allocation number is set appropriately.

Next, explanation is given for Golomb coding of a difference value of quantized pixels from the subtractor 204 in the variable-length encoding unit 205.

Figure 8:
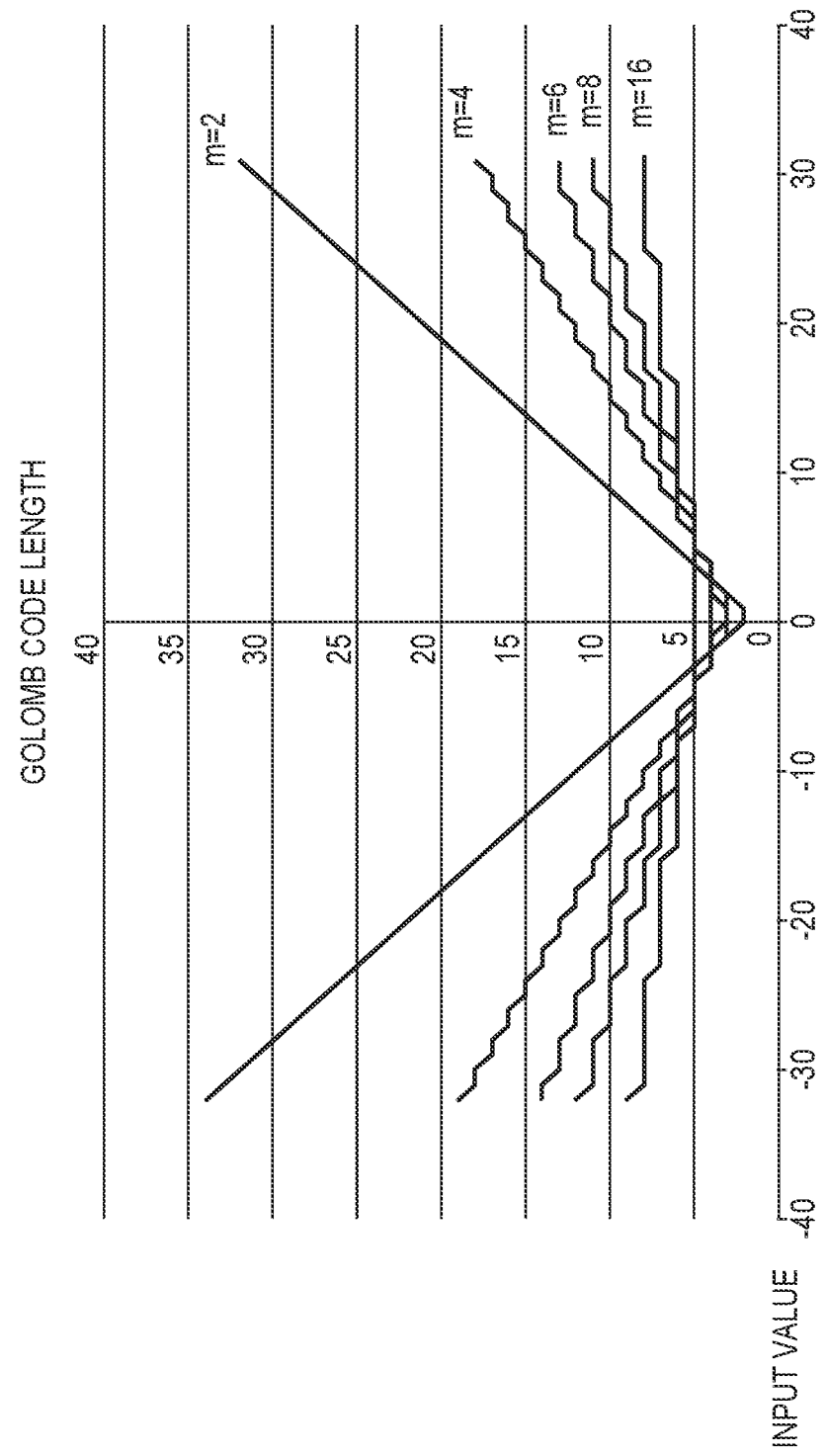
FIG. 8 is a view for a relationship between a code length of Golomb code words and an m value.

Golomb coding is an encoding method in which the code length of a code word becomes shorter the smaller the absolute value of a value to be encode, and is a method in which the degree of change of the code length of the code word with respect to the value to be encoded changes in accordance with an encoding parameter "m". FIG. 8 illustrates the code length of a code word (vertical axis) with respect to an input value (horizontal axis), in Golomb coding. There is a tendency for change of the code length with respect to change of the input value to increase as the encoding parameter m decreases. Specifically, even with the same input value, if the encoding parameter m is set appropriately, it means that the input value can be encoded with a high compression rate. In the embodiment, the encoding parameter "m" is also included in the compression parameters of FIG. 3.

Figure 5:
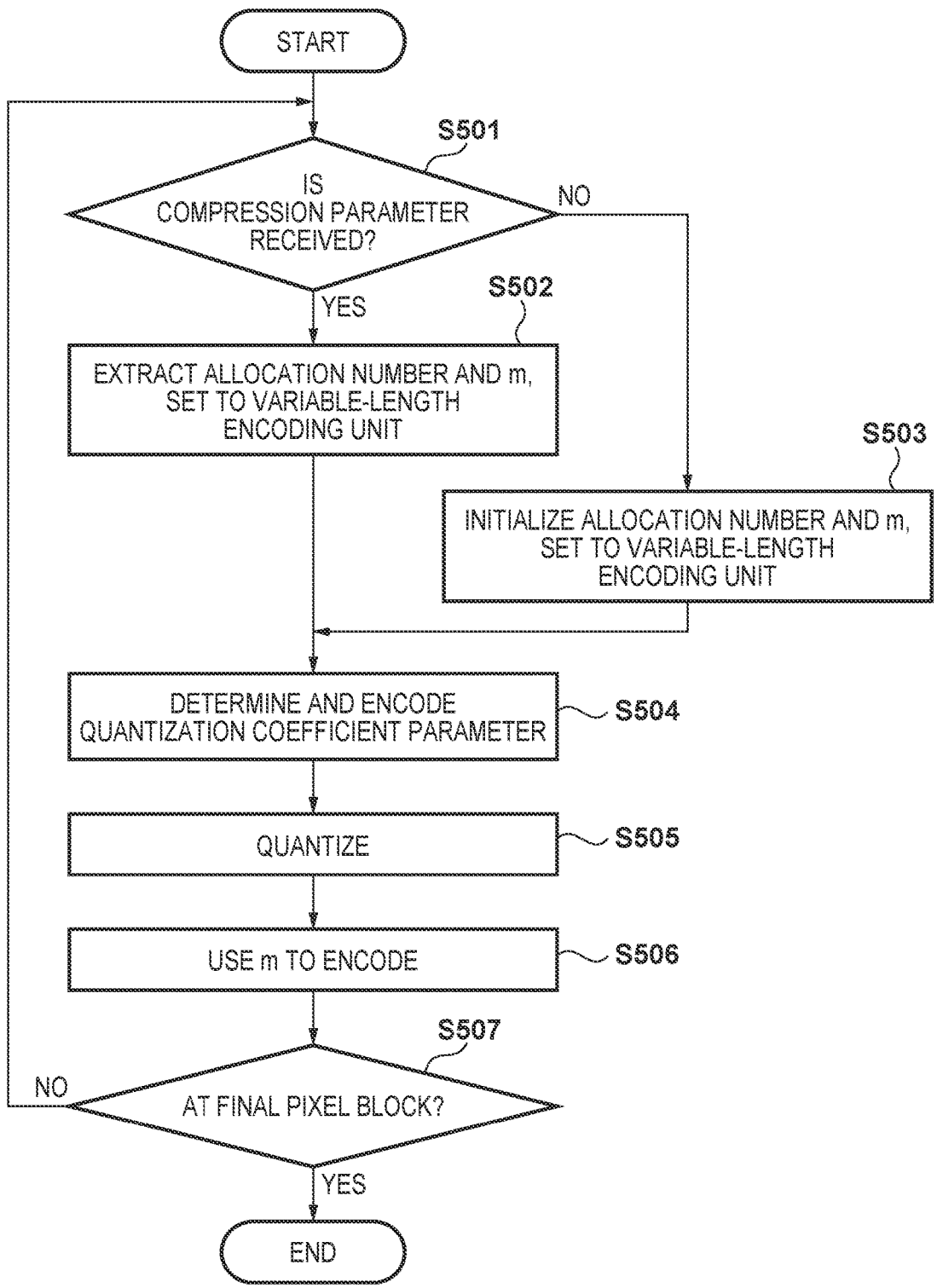
FIG. 5 is a flowchart illustrating processing by an image transmitting unit in the embodiment.

The processing flow of the compression unit 104 in the embodiment as above is explained using the flowchart of FIG. 5. The processing of FIG. 5 is executed by the control unit 151 of the image transmitting unit 101 controlling each unit.

The control unit 151, in step S501, determines whether the compression parameters have been received from the image receiving unit 102. If received (YES in step S501) the processing proceeds to step S502, and the control unit 151 extracts the allocation number and the encoding parameter m included in the received compression parameters, and sets them to the variable-length encoding unit 205. The processing then proceeds to step S504.

Meanwhile, if the compression parameters have not been received (NO in step S501), the control unit 151 advances the processing to step S503, initializes each of the allocation number and the encoding parameter m with values that are set in advance, and sets them to the variable-length encoding unit 205. Note that, in the present embodiment, if the compression parameters cannot be received, initial values that are defined in advance are used, but, for example, use of an allocation number and an encoding parameter used when performing compression encoding of an immediately preceding pixel block may be continued.

As described above, because the image capturing device 103 typically outputs image data of each pixel at a fixed speed, it is not possible to temporarily stop operation of the image capturing device 103 due to circumstances of subsequent processing such as compression processing. Specifically, the compression processing continues even in a case in which the allocation number cannot be received due to some kind of circumstance.

In step S504, the control unit 151 causes the quantization coefficient determination unit 202 to determine the quantization coefficient parameter n, and causes the variable-length encoding unit 205 to encode the quantization coefficient parameter n in accordance with the allocation number.

Next, in step S505, the control unit 151 calculates the quantization coefficient based on the quantization coefficient parameter n determined by the quantization coefficient determination unit 202, and causes the quantizing unit 201 to execute quantization processing in accordance with the calculated quantization coefficient. The control unit 151, in step S506, causes the variable-length encoding unit 205 to execute Golomb coding processing in accordance with the encoding parameter m on the difference value of the quantized pixels outputted by the subtractor 204, and on the quantization coefficient parameter outputted by the quantization coefficient determination unit 202.

In step S507, the control unit 151 determines whether the pixel block subjected to the encoding processing is the last pixel block, and if it is the last pixel block (YES in step S507), the processing ends. Meanwhile, if it is not the last pixel block (NO in step S507), the processing returns to step S501, and the control unit 151 performs the compression encoding processing on the next pixel block. Here, the last pixel block of a frame being transmitted at a point in time when there is an instruction for ending image capturing processing or an instruction to end compression processing from the image receiving unit 102 is set as the last pixel block in step S507.

As a result of the above, the compression unit 104 generates encoded data for the differences between pixel values after quantization and encoded data for the quantization coefficient parameters n as the encoded data of the pixel block of interest. This is supplied to the image receiving unit 102, via the transmitting unit 105.

<Explanation of Decompression Unit>

Figure 3:
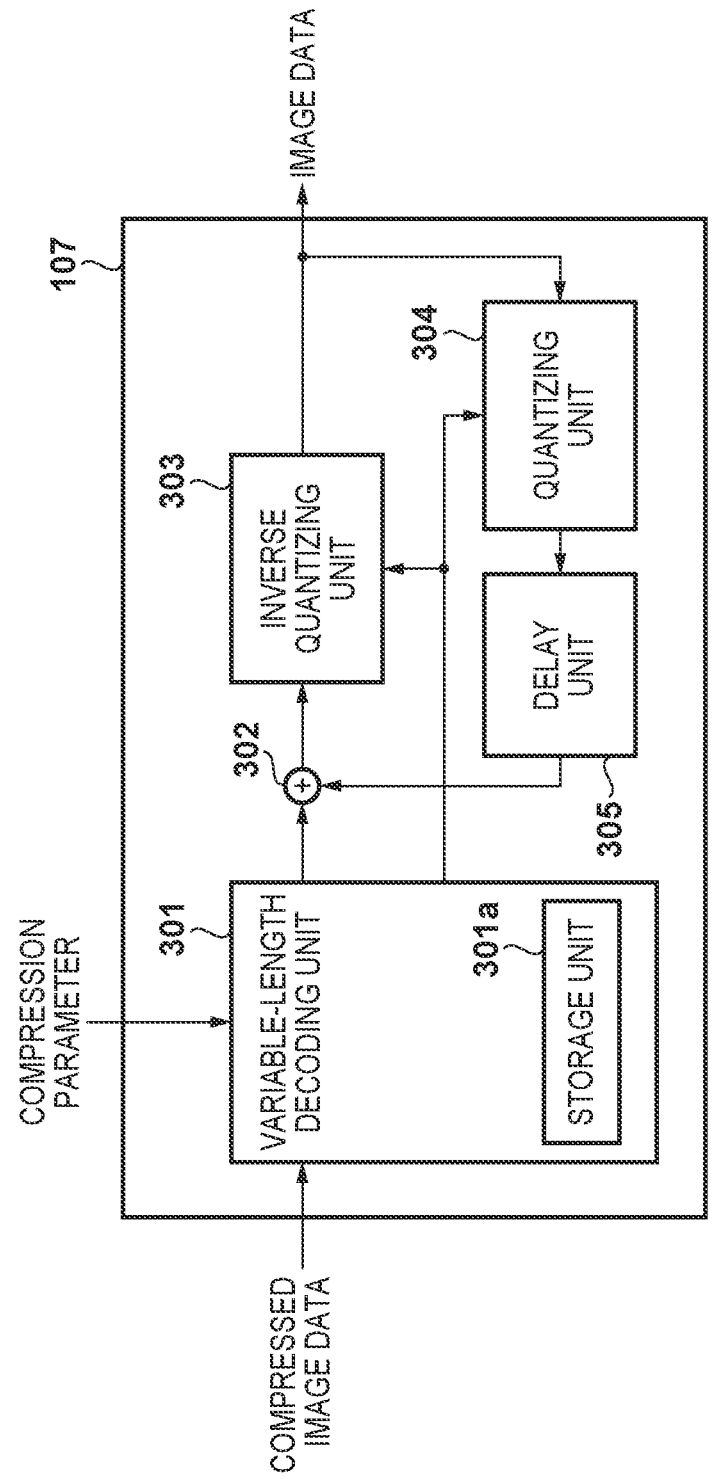
FIG. 3 is a block configuration diagram of a decompression unit in the embodiment.

Next, explanation is given for the decompression unit 107 in the image receiving unit 102 in the embodiment. FIG. 3 is a block configuration diagram of the decompression unit 107 in the embodiment.

A variable-length decoding unit 301 has a storage unit 301a for storing tables illustrated in FIGS. 7A to 7H. The variable-length decoding unit 301 separates the encoded data of each of the difference values of the quantized pixels and the quantization coefficient parameters that were multiplexed in the inputted compressed image data, and decodes each of them. When decoding a quantization coefficient parameter, one table is identified from the allocation number, and the decoding is performed by using that table. Therefore the variable-length decoding unit 301 reads out from the buffer 110 information that is the same as the compression parameters supplied to the image transmitting unit 101. The variable-length decoding unit 301 supplies the decoded quantization coefficient parameter n to an inverse quantizing unit 303 and a quantizing unit 304. In addition, the variable-length decoding unit 301 supplies the difference values of the quantized pixel in order to an adder 302.

The inverse quantizing unit 303, by the multiplying the pixel value which is in a quantized state by an inverse quantization coefficient $2^n$ determined from the quantization coefficient parameter n that is decoded by the variable-length decoding unit 301, restores it to the original pixel value having 12 bits for one pixel and outputs it. The restored pixel value is divided by the quantization coefficient $2^n$ by the quantizing unit 304, and stored in a delay unit 305. By delaying a pixel value by one pixel's worth, the delay unit 305 supplies it as a pixel value for one preceding pixel for the adder 302. Note that it is assumed that the delay unit 305 is cleared to zero before decoding a pixel block of interest. This is to correctly decode the head pixel of a pixel block of interest by having the adder 302 output zero when decoding the head pixel of the pixel block of interest.

The processing flow of the decompression unit 107 in the embodiment as above is explained below using the flowchart of FIG. 6. Please note that the processing flow explained below includes the processing of the analyzing unit 109 and the buffer 110. The processing of FIG. 6 is executed by the control unit 161 of the image receiving unit 102 controlling each unit.

Firstly, in step S601, the control unit 161 determines whether encoded data of the pixel block of interest has been received from the image transmitting unit 101. If not received (NO in step S601), the processing returns to step S601, and reception of encoded data is awaited. Meanwhile, if encoded data is received (YES in step S601), the processing advances to step S602.

In step S602, the control unit 161 reads from the buffer 110 compression parameters (including an allocation number and an encoding parameter m) of a succeeding pixel block that is to be decompressed after the pixel block of interest, and transmits them to the image transmitting unit 101.

Note that, in the present embodiment, notification is made for the compression parameters of a pixel block to be received next in order to simplify the explanation, but compression parameters for a subsequent second or third pixel block to be received may be transmitted.

In addition, prior to encoding, the control unit 161 is assumed to store compression parameters as initial values for 30 pixel blocks B(0, 0) to B(29, 0) on the first line to be encoded in the buffer 110. In addition, the control unit 161 also sets an initial value of "0" to the delay unit 305.

In step S603, the control unit 161 reads out the compression parameters for the received pixel block of interest from the buffer 110. The control unit 161 causes the variable-length decoding unit 301 to decode the quantization coefficient parameter n by referring to the allocation number included in the compression parameters. The control unit 161 sets a quantization coefficient calculated based on the quantization coefficient parameter n to the inverse quantizing unit 303 and the quantizing unit 304. The inverse quantizing unit 303 and the quantizing unit 304 each use the quantization coefficient calculated based on the quantization coefficient parameter n to perform inverse quantization and quantization, but simply processing for shifting n bits is performed. In addition, the variable-length decoding unit 301 sends the decoded quantization coefficient parameter to the analyzing unit 109.

In step S604, the control unit 161 decodes the received encoded pixel data of the pixel block of interest. Specifically, the variable-length decoding unit 301 decodes the encoded data of the difference value of a quantized pixel in accordance with the encoding parameter m, and supplies it to the adder 302. The adder 302 adds quantized pixel data that was decoded immediately prior and the difference data of the quantized pixel, and supplies a result of the adding as quantized pixel data to the inverse quantizing unit 303. The inverse quantizing unit 303 performs inverse quantization of the quantized pixel data inputted from the adder 302, and outputs pixel data to the encoding unit 108 and the quantizing unit 304. The inverse quantizing unit 303 performs an inverse quantization of the quantized pixel data, outputs a result thereof as decoded pixel data to the encoding unit 108 and the quantizing unit 304, and stores the pixel data after quantization in the delay unit 305 to prepare for decoding processing of subsequent quantized pixel data. In addition, the inverse quantizing unit 303 also outputs the pixel data after inverse quantization to the analyzing unit 109.

The control unit 161 controls the analyzing unit 109 to determine, from the pixel block of interest that is obtained by decoding based on the quantization coefficient parameters from the variable-length decoding unit 301 and the pixel data from the inverse quantizing unit 303, compression parameters of an unreceived pixel block that is positioned below this pixel block of interest, and stores the determined compression parameters in the buffer 110 (step S605). An explanation in more detail will be given for these points.

From FIG. 4, when the pixel block of interest is defined as B(i, j), the pixel block positioned below can be defined as B(i, j+1). Because the pixel blocks B(i, j) and B(i, j+1) are adjacent to each other, it can be estimated that a probability of the pixel block B(i, j+1) being similar to the pixel block of interest B(i, j) is high. Accordingly, the analyzing unit 109 detects, from the correspondence tables illustrated in FIGS. 7A to 7H, an allocation number of a correspondence table such that the code word of the quantization coefficient parameter n of the decoded pixel block of interest will be a minimum, and determines this allocation number as the allocation number of the pixel block below the decoded pixel block of interest. For example, if the quantization coefficient parameter n of a pixel block of interest decoded here is 5, the correspondence table for which the code length for the quantization coefficient parameter "5" will be a minimum out of FIGS. 7A to 7H is the correspondence table for the allocation number "5", FIG. 7F. Therefore, the allocation number "5" is determined as the allocation number of the quantization coefficient parameter of the pixel block below the pixel block of interest which is decoded here, and stored in the buffer 110.

Note that, each time one pixel block of interest is decoded, the allocation number of the quantization coefficient parameter of the pixel block below the pixel block of interest is determined, but another configuration may be taken. For example, it is possible to obtain an average value of the quantization coefficient parameters of one line's worth of pixel blocks after decoding, and use it as the allocation number of the quantization coefficient parameter of the next one line's worth of pixel blocks. In such a case, the allocation number of the quantization coefficient parameters of a pixel block is determined in units of one line, stored in the buffer 110, and then sent to the image transmitting unit 101. In addition, it is possible to have a configuration for determining, based on the quantization coefficient parameters of a plurality of decoded adjacent pixel blocks, the allocation number of the quantization coefficient parameters of a pixel block adjacent below the plurality of decoded pixel block. It is further possible to have a configuration in which the allocation number of the quantization coefficient parameters of a subsequent screen's worth or a subsequent plurality of line's worth of pixel blocks are determined based on an average value of the quantization coefficient parameters of a plurality of line's worth or one screen's worth of decoded pixel blocks. In such a case, the allocation number of the quantization coefficient parameters is sent to the image transmitting unit 101 for each one screen or for each of the plurality of lines. In this way, based on quantization coefficient parameters of a result of decoding a first unit of processing that includes a received predetermined number of pixel blocks, a determination is made by the image transmitting unit 101 for the quantization coefficient parameters for a second unit of processing that include a predetermined number of pixel blocks that are encoded and transmitted after the pixel blocks for the first unit of processing. The quantization coefficient parameters, which have a predetermined number of pixel blocks as a unit, are transmitted to the image transmitting unit 101.

Furthermore, based on the decoded pixel data of a pixel block of interest, the analyzing unit 109 performs Golomb coding similarly to the compression unit 104 while changing the encoding parameter m, to obtain an encoding parameter m for which the total code amount of the pixel block of interest is a minimum. The determined encoding parameter m is stored in the buffer 110 as the encoding parameter m for the pixel block below the pixel block of interest decoded here, and then sent to the image transmitting unit 101. Note that, for the encoding parameter m, similarly to the allocation number of the quantization coefficient parameter, it may be determined by the analyzing unit 109 in units of a plurality of pixel blocks, units of lines, units of a plurality of lines, or units of screens, and then sent to the image transmitting unit 101.

The analyzing unit 109 stores the {allocation number, encoding parameter m} obtained as described above in the buffer 110 as the compression parameters for the pixel block B(i, j+1).

In other words, based on the result (a first pixel block) of decoding a pixel block that is decoded here, the analyzing unit 109 determines compression parameters for which it is assumed that a code amount for a case in which the image transmitting unit performs compression encoding on a pixel block (a second pixel block) to transmit after the first pixel block is a minimum.

The decompression unit 107, in step S606, determines whether the pixel block of interest is the last pixel block of the image data to be encoded, and if not returns the processing to step S601.

As explained above, by virtue of the present embodiment, by image data to be transmitted from the image transmitting unit 101 to the image receiving unit 102 being efficiently subject to compression encoding, it is possible to suppress bandwidth of the transmission bus 140 from being pressured therebetween. It is predicted that image capturing resolution will further increase in the future. An effect will be large in an environment such as where an image sensor is implemented as a single IC circuit, as with the image transmitting unit 101 of the embodiment.

Typically, it is difficult to have a mixed stacking of a large scale circuit in an image sensor device that is equivalent to an image transmitting unit. However, by applying the aforementioned embodiment, it is possible to perform compression that has a high compression efficiency without bloating the scale of the logic circuit on the image sensor side.

Note that, in the aforementioned embodiment, explanation was given of a pixel block being data of 64 pixels consecutive in the horizontal direction, but this is only an example. It is possible to generalize one block as h×v pixels: h horizontal pixels and v vertical pixels.

In addition, in the aforementioned embodiment, explanation was given of the compression parameters that the image receiving unit 102 transmits to the image transmitting unit 101 including the quantization coefficient parameter n and the encoding parameter m, but configuration may be taken such that the parameters only include one of these. Coding efficiency in the case of using only one of them is lower than when both are employed, but there is the merit of the implementation being easier to achieve.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-127857, filed Jun. 28, 2016, which is hereby incorporated by reference herein in its entirety.

What is claimed is:

1. An image transmission system, comprising an image transmitting unit, and an image receiving unit connected to the image transmitting unit via a transmission bus,
wherein the image transmitting unit has
a compression unit configured to compress a pixel block configured by a plurality of pixels in image data to be compressed in accordance with a provided compression parameter, and
a first transmitting unit configured to transmit compressed data obtained by the compression unit to the image receiving unit,
wherein the image receiving unit has
a receiving unit configured to receive the compressed data from the image transmitting unit,
a decompression unit configured to decompress the received compressed data,
a determination unit configured to determine a compression parameter based on a result of decompression of a first pixel block by the decompression unit, and
a second transmitting unit configured to transmit the determined compression parameter to the image transmitting unit,
wherein the compression unit compresses an untransmitted second pixel block in the image data to be compressed in accordance with the compression parameter transmitted by the second transmitting unit, and
wherein the decompression unit decompresses compressed data of the second pixel block from the image transmitting unit in accordance with the compression parameter determined by the determination unit.

2. The system according to claim 1, wherein the image transmitting unit is a semiconductor integrated circuit chip integrated with an image sensor configured to generate image data to be compressed.

3. The system according to claim 1, wherein the compression unit includes a quantization coefficient determination unit configured to determine a quantization coefficient used when quantizing a pixel,
a quantizing unit configured to quantize each pixel of the pixel block in accordance with the determined quantization coefficient, and
an encoding unit configured to encode data relating to the quantization coefficient and data relating to pixel data after the quantizing, to generate the compressed data,
wherein the compressed data achieved by the compression unit includes the encoded data relating to the quantization coefficient and the encoded data relating to the pixel data after the quantizing.

4. The system according to claim 3, wherein the compression parameter includes information that identifies one of a plurality of tables set in advance that is referred to when the encoding of the data relating to the quantization coefficient is performed,
wherein the decompression unit decodes the encoded data of the data relating to the quantization coefficient included in the compressed data, and
wherein the image receiving unit further has an analyzing unit configured to determine one of the plurality of tables as a table for the second pixel block based on the decoded data relating to the quantization coefficient.

5. The system according to claim 1, wherein the compression unit includes
a quantizing unit configured to quantize each pixel of the pixel block, and
a Golomb coding unit configured to perform Golomb coding of a difference between adjacent pixels after quantizing.

6. The system according to claim 5, wherein the compression parameter includes a parameter m that is used by the Golomb coding unit,
wherein the image receiving unit determines the parameter m for the second pixel block based on decoded pixel data of the first pixel block that is decompressed by the decompression unit.

7. The system according to claim 1, wherein the compression unit includes
a quantization coefficient determination unit configured to determine a quantization coefficient used when quantizing each pixel included in the pixel block,
a quantizing unit configured to quantize each pixel of the pixel block in accordance with the determined quantization coefficient, and
an encoding unit configured to encode data relating to the quantization coefficient and perform Golomb coding of a difference between adjacent pixels after the quantizing by quantization unit, and
the compression parameter includes
an encoding parameter m used in the Golomb coding and information that identifies one of a plurality of tables set in advance that are referenced when encoding the data relating to the quantization coefficient.

8. The system according to claim 3, wherein the quantization coefficient determination unit
determines the data relating to the quantization coefficient based on a variance of pixels included in the pixel block or a difference between a maximum value and a minimum value of pixel values.

9. The system according to claim 1, wherein the image receiving unit further has an analyzing unit configured to determine a compression parameter used in a predetermined number of pixel blocks that includes the second pixel block, based on a result of decompression of a predetermined number of pixel blocks that includes the first pixel block that are decompressed by the decompression unit.

10. The system according to claim 1, wherein the image transmitting unit and the image receiving unit are implemented in an image capturing apparatus.

11. A method of controlling an image transmission system that includes an image transmitting unit and an image receiving unit connected to the image transmitting unit via a transmission bus, the method comprising:
at the image transmitting unit,
compressing a pixel block configured by a plurality of pixels in image data to be compressed in accordance with a provided compression parameter, and
transmitting compressed data obtained by the compressing to the image receiving unit, and
at the image receiving unit,
receiving the compressed data from the image transmitting unit,
decompressing the received compressed data,
determining a compression parameter based on image data of a first pixel block obtained by the decompressing, and
transmitting the determined compression parameter to the image transmitting unit,
wherein, at the image receiving unit, the compressed data of a second pixel block from the image transmitting unit is decompressed in accordance with the determined compression parameter.

12. An image receiving device comprising:
a receiving unit configured to receive compressed data from an image transmitting device,
a decompression unit configured to decompress the received compressed data,
a determination unit configured to determine a compression parameter based on a result of decompression of a first pixel block in image data by the decompression unit, and
a transmitting unit configured to transmit the determined compression parameter to the image transmitting device,
wherein the image transmitting device compresses an untransmitted second pixel block in the image data to be compressed in accordance with the compression parameter transmitted by the transmitting unit, and
wherein the decompression unit decompresses compressed data of the second pixel block from the image transmitting device in accordance with the compression parameter determined by the determination unit.

13. An image transmitting device comprising:
a compression unit configured to compress a first pixel block configured by a plurality of pixels in image data to be compressed in accordance with a provided compression parameter, and
a transmitting unit configured to transmit the compressed data obtained by the compression unit to the image receiving device,
a receiving unit configured to receive a second compression parameter which is determined based on a result of decompression of the first pixel block, from the image receiving unit,
wherein the compression unit compresses an untransmitted second pixel block in the image data to be compressed in accordance with the second compression parameter received by the receiving unit, and
wherein the compressed data of the second pixel block is decompressed in accordance with the second compression parameter by the image receiving device.

14. A method of controlling an image receiving device comprising the steps of:
receiving compressed data from an image transmitting device,
decompressing the received compressed data,
determining a compression parameter based on a result of decompression of a first pixel block in image data, and
transmitting the determined compression parameter to the image transmitting device,
wherein the image transmitting device compresses an untransmitted second pixel block in the image data to be compressed in accordance with the transmitted compression parameter, and
wherein the compressed data of the second pixel block from the image transmitting device is decompressed in accordance with the determined compression parameter.

15. A method of controlling an image transmitting device comprising the steps of:
compressing a first pixel block configured by a plurality of pixels in image data to be compressed in accordance with a provided compression parameter, and
transmitting the compressed data to the image receiving device,
receiving a second compression parameter which is determined based on a result of decompression of the first pixel block, from the image receiving unit,
wherein an untransmitted second pixel block in the image data to be compressed is compressed in accordance with the received second compression parameter, and
wherein the compressed data of the second pixel block is decompressed in accordance with the second compression parameter by the image receiving device.

* * * * *